March 27, 1951          H. C. BARILE          2,546,329

LENS INSPECTING AND LAYOUT DEVICE

Filed July 26, 1948          2 Sheets-Sheet 1

Inventor
Henry C. Barile by Robert J. Newman
Francis W. Anderson   Agents

March 27, 1951            H. C. BARILE            2,546,329

LENS INSPECTING AND LAYOUT DEVICE

Filed July 26, 1948            2 Sheets-Sheet 2

Inventor
Henry C. Barile by Robert J. Newman
Francis W. Anderson    Agents

Patented Mar. 27, 1951

2,546,329

UNITED STATES PATENT OFFICE 2,546,329

LENS INSPECTING AND LAYOUT DEVICE

Henry C. Barile, Brookfield, Ill., assignor to Ophthalmix, Brookfield, Ill., an unincorporated company, not a partnership Application July 26, 1948, Serial No. 40,668

3 Claims. (Cl. 33—1)

This invention relates to measuring devices. It is more particularly concerned with an improved protractor for inspecting and laying out lenses and lens blanks.

One of the principal objects of this invention is to provide a protractor wherein the measuring surface is concave, and therefore particularly suitable for use in laying out and marking lens blanks preparatory to grinding, finishing and the like. The concave surface of my protractor enables all of that portion of the lens that is to be marked to be brought into approximately the same degree of proximity to the scale markings.

Another object is to provide a light-transmitting protractor of the above character in combination with illuminating means capable of supplying substantially uniform illumination throughout the areas of the protractor.

A further object of this invention is to provide a protractor that has incorporated therein means for insuring the observer that his inspection or line of sight is substantially perpendicular or normal to the protractor, thus enabling him to avoid parallax.

Still another object is to provide a protractor and illumination means of the type described in a convenient and easily movable casing.

One of the principal features of this invention comprises a protractor wherein the measuring surface is concave and the opposite surface is plane. The concave surface enables the protractor to receive curved objects such as lenses more readily and brings about greater accuracy in the measuring of the curved object inasmuch as the surface of said object is at all points substantially equidistant from the markings on the measuring surface. The plane surface is of particular benefit and advantage when used in conjunction with the illuminating means herein disclosed. Said illuminating means comprises a block of polymethylmethacrylate having a roughened surface substantially parallel to and immediately below the plane surface of the protractor. All other surfaces of the block are polished. A source of illumination such as an ordinary electric light bulb is located at one end of said block. The light from the bulb is "piped" through the block and escapes through the roughened surface. The block is of substantially the same area and shape as the plane surface of the protractor. The intensity of the illumination leaving any given portion of the roughened surface of the plastic block is substantially equal to that leaving any other portion of said surface. Because the lower surface of the protractor is plane and because of the spacial relationship between this surface and the roughened surface of the polymethylmethacrylate block, the amount of light falling upon any unit area of the plane surface and transmitted into and through the protractor is substantially equal to that striking any other unit area of said surface. This arrangement of illuminating means and protractor results in soft, even lighting to all parts of the chart.

Other objects and advantages of the invention will become apparent from the following detailed description thereof taken in conjunction with the accompanying drawings. It will be apparent to those skilled in the art that a number of changes and modifications may be made in the details of construction, arrangements of parts, and methods shown and described without departing from the spirit of the invention as expressed in the accompanying claims. Accordingly, I do not wish to be limited to the exact details of construction, arrangement of parts, and methods shown and described; for the preferred forms only have been given by way of illustration and said forms are not to be taken in a limitative sense.

Referring to the drawings.

Figure 1:
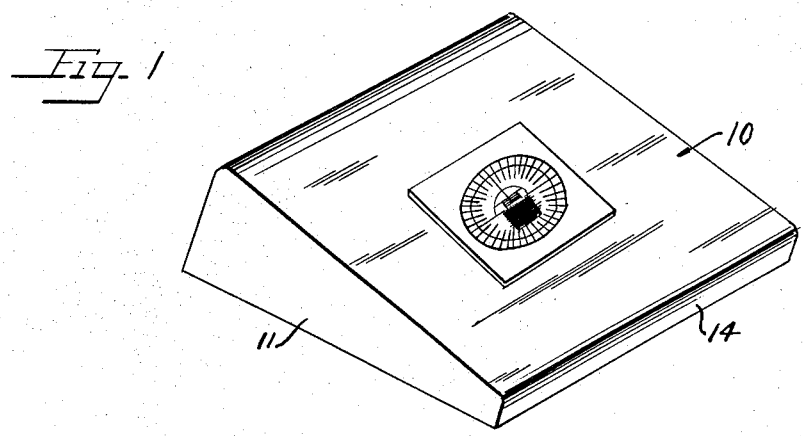
Figure 1 is a perspective view of a protractor assembly constructed according to the teachings of the present invention.
Figure 2:
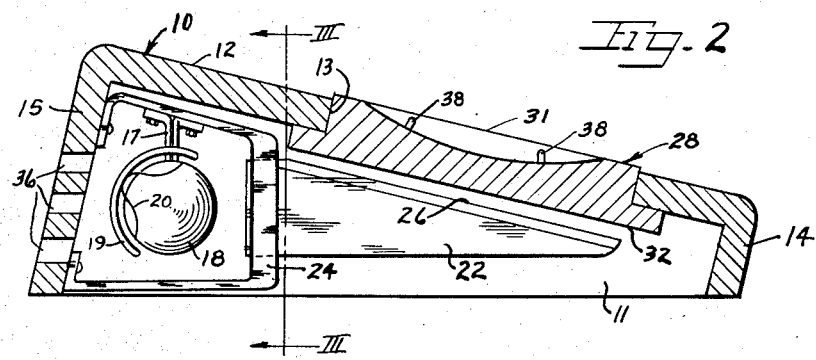
Figure 2 is a vertical sectional view.
Figure 3:
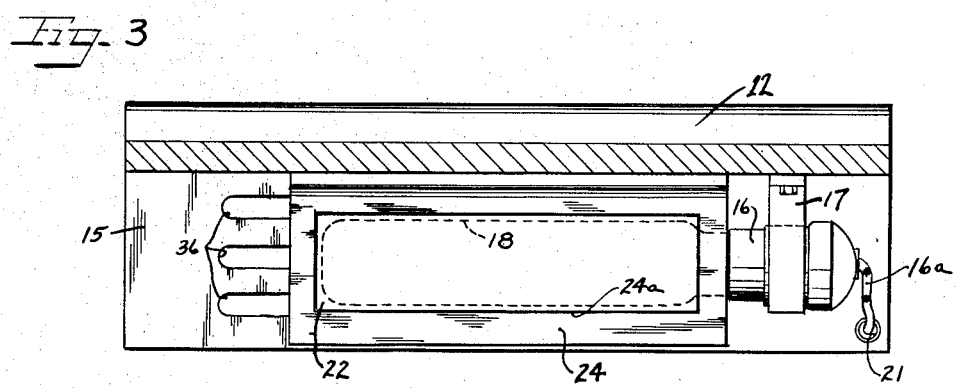
Figure 3 is a vertical sectional view taken on line III—III of Figure 2.
Figure 4:
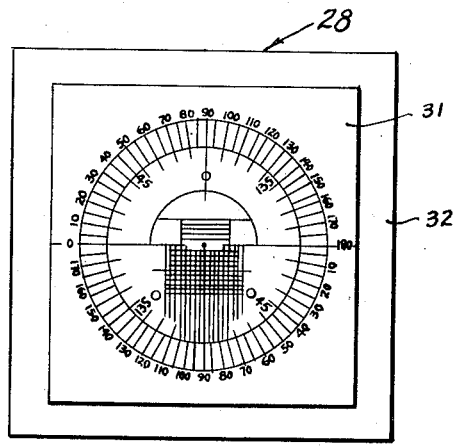
Figure 4 is a plan view of the detached protractor unit of the assembly.
Figure 5:
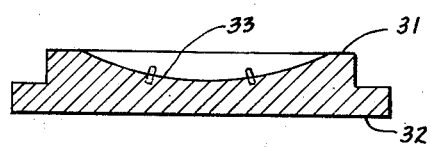
Figure 5 is a vertical sectional view of said protractor.
Figure 6:
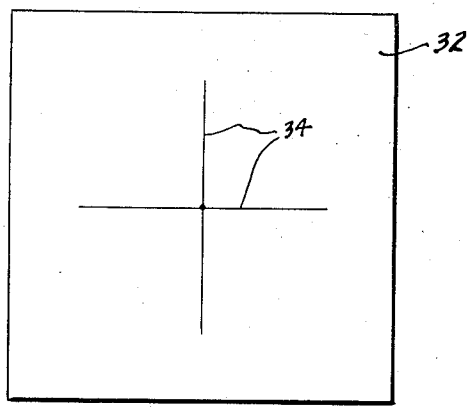
Figure 6 is a bottom view of the detached protractor unit.

Referring to the drawings wherein similar reference characters designate corresponding parts throughout the several views, the device embodying the invention comprises an open-bottomed hollow casing 10 having an upper angled wall portion 12 containing a square opening 13 therein and slanted front and rear walls 14 and 15 respectively. The rear wall contains louvres or apertures 36. Internally of the casing there is supported by a suitable bracket 17, a source of illumination 18 in the form of an electric lamp or bulb. The lamp or bulb may have a cap or hood 19 secured thereto as by spring clamps or the like 20. The object of these caps or hoods, if employed, is to directionalize the light into a block 22 of polymethylmethacrylate located within the casing below the protractor. Such an arrangement insures that substantially the only light reaching the lower surface of the protractor is that diffused through the plastic member. Thus the protractor is lighted by soft, uniform illumination and little or no harsh light impinges upon said protractor.

Supported on a suitable bracket, brackets, or the like 24, is a block 22 of "Plexiglas," a transparent acrylic plastic known technically as polymethylmethacrylate. This block is disposed directly beneath the protractor and all surfaces, except the one that is substantially parallel to and closest to the lower surface of the protractor, are polished. The surface 26 of the acrylic block that is closest to and substantially parallel to the lower surface of the protractor is roughened in order that the light will escape therethrough. I prefer to roughen the surface by sanding or sandblasting in order to obtain a uniform degree or roughness and, hence, a substantially uniform emission of light from all parts of said surface.

Bracket 24 has in the front portion thereof rectangular opening 24a, the purpose of which is to receive and hold the acrylic plastic block 22 in the desired alignment with the protractor. Lamp bulb 18 preferably is elongated and is of such size that it substantially covers the end of plastic block 22, thereby directing approximately the same quantity of light into all parts of the block.

I next refer to protractor 28 that is supported in opening 13 by suitable screws, cleats, or the like 29.

As hereinbefore stated, the protractor is plano-concave in shape. The advantages of the concave measuring surface become obvious when it it remembered that practically all of the modern ophthalmic lens are of a dish or curved shape. It is difficult to accurately lay off the desired markings on the lens when using a flat protractor due to the fact that the surface of the lens does not match the surface of the protractor. It is difficult when the convex side of the lens is brought into contact with the flat surface of the protractor to prevent the lens from rocking and getting out of position and resulting in markings that are erroneous. These difficulties are overcome in my protratcor by the use of a concave measuring surface. In order to conveniently support the lens or lens blank and to keep the lens from injuring or defacing the markings on the protractor, three small buttons or lugs 38 are secured thereon substantially equidistant from each other and from the center.

The top surface 31 of the protractor in which is located the measuring surface is of the same size and shape as opening 13 in the upper wall of the casing. A rim or border portion 32 is provided on the protractor for engaging the lower surface of said upper wall.

In a typical assembly, block 28 is approximately 2.5" square and a portion of the top surface is countersunk to about 7.5 diopters of curvature. Graduated millimeter lines, circles, principal axes, and degree numerals are located on the measuring surface. They may be formed by hot stamping, etching, or the like. Located on the bottom surface of the protractor are principal axes 34 that are in perpendicular alignment with the principal axes on the measuring surface. These perpendicularly aligned axes on the opposite surfaces of the block afford means for avoiding parallax.

The protractor block is made of light-transmitting, by which I mean transparent or semi-transparent, material. Suitable materials include glass, polymethylmethacrylate, cellulose acetate and similar cellulose plastics, polystyrene, and the clear allyl resins.

The use of this protractor eliminates the necessity for ink spotting the segment outline or dividing line, because the segment dividing line is entirely visible when looking into the protractor. Straight top segment bifocal lenses may, therefore, be more accurately aligned by using the horizontal lines below the 180 degree median line as a guide. In locating the segment center of a round, arched, or straight top bifocal, the segment is placed over the segment outlines on the protractor, and the center may be easily spotted. After this is done, the lens may be moved on the protractor, placing the segment dividing line and the spotted center at the desired height and inset. The lens may then be marked for the cutting and edging operations.

From the foregoing description, it will be seen that simple, efficient, and economical means have been provided for accomplishing the objects of the present invention.

I claim as my invention:

1. A device of the character described comprising a casing having an opening therein, a light-transmitting plano-concave plate supported in said opening and having protractor markings on the concave surface thereof, a polymethylmethacrylate block internally of the casing, said block having a roughened surface adjacent to and substantially parallel to the plane surface of said plate, and a source of illumination within the casing adjacent said polymethylmethacrylate block.

2. A device of the character described comprising a ventilated casing having an opening in the upper wall thereof, a light-transmitting plano-concave plate supported in said opening and having protractor markings on the concave surface thereof, a polished polymethylmethacrylate block disposed within the casing below said plate, said block having a roughened surface substantially parallel to the plane surface of the plate, and a source of illumination within the casing adjacent an end of said block.

3. A device of the character described comprising a casing having side walls, end walls, and a sloping upper wall with an opening therein, a light-transmitting plano-concave plate supported in said opening and having protractor markings on the concave surface thereof, a polymethylmethacrylate block supported within the casing below said plate, said block having a roughened surface substantially parallel to the plane surface of the plate and in close proximity thereto, and a source of illumination within the casing at the deep end thereof and adjacent a polished end of said block.

HENRY C. BARILE.

REFERENCES CITED

The following references are of record in the file of this patent:

UNITED STATES PATENTS

| Number | Name | Date |
|---|---|---|
| 674,951 | Abee | May 28, 1901 |
| 1,336,040 | Mathewson | Apr. 6, 1902 |
| 1,532,878 | Bugbee | Apr. 7, 1925 |
| 1,532,880 | Bugbee | Apr. 7, 1925 |
| 1,840,568 | Clark | Jan. 12, 1932 |
| 2,347,665 | Christensen et al. | May 2, 1944 |
| 2,413,198 | Stewart | Dec. 24, 1946 |
| 2,518,796 | Laisne | Aug. 15, 1950 |